United States Patent [19]

McLaughlin et al.

[11] 4,175,215

[45] Nov. 20, 1979

[54] MULTIPORT CONFERENCE CIRCUIT

[75] Inventors: Donald W. McLaughlin, Naperville; Gerald F. Fetterer, Mount Prospect, both of Ill.

[73] Assignee: GTE Automatic Electric Laboratories Incorporated, Northlake, Ill.

[21] Appl. No.: 857,168

[22] Filed: Dec. 5, 1977

[51] Int. Cl.² .................................. H04M 3/56
[52] U.S. Cl. .................... 179/18 BC; 179/15 AT; 340/147 R
[58] Field of Search ............... 340/147 R; 179/18 BC, 179/15 AT, 1 CN

[56] References Cited

U.S. PATENT DOCUMENTS

| | | |
|---|---|---|
| 4,007,338 | 2/1977 | McLaughlin .................. 179/18 BC |
| 4,022,981 | 5/1977 | McLaughlin et al. .......... 179/18 BC |
| 4,054,755 | 10/1977 | Lee et al. .................... 179/18 BC X |

Primary Examiner—John W. Caldwell, Sr.
Assistant Examiner—Daniel Myer
Attorney, Agent, or Firm—Charles A. Doktycz

[57] ABSTRACT

An improved conference technique whereby a number of channels in a telephone switching system employing pulse code modulation for transmission purposes are combined so that a number of subscribers may participate in a common telephone conversation. The conference circuit is provided with a continuous threshold to pass the primary signal and to exclude the reflection. It is only used in the selection process, and for conditions which do not provide the threshold being met, the previous speaker is retained.

7 Claims, 5 Drawing Figures

MULTIPORT CONFERENCE CIRCUIT

BACKGROUND OF THE INVENTION

1. Field of the Invention

This invention relates generally to transmission and switching techniques in telephone communication systems and, more particularly, to an improved conference technique whereby a number of channels in a telephone switching system employing pulse code modulation for transmission purposes are combined so that a number of subscribers may participate in a common telephone conversation. More particularly still, it relates to improvements in a multi-port conference circuit of the type disclosed in U.S. Pat. No. 4,054,755, which is assigned to the same assignee as the present invention.

The present invention pertains to a multi-port conference circuit for use in a private automatic branch exchange similar to those units manufactured by GTE Automatic Electric Incorporated and designated GTD120. Circuitry with minimum modification could also be employed in class five central offices that employ digital switching. Such telephone systems employ a time switching network rather than the most prevalent earlier space divided switching network.

In time division switching networks a requirement exists to have sources of pulse code modulated voice samples associated with time slots. These time slots allow the conference to sequentially receive the code for each conferee. For the conference circuit to be effective, it must be able to recognize who the conferees are and, of course, who is not associated with the conference. The circuitry must also be capable of distributing the conference speakers' code to each conferee. Information of this sort is, of course, available in the telephone switching systems referred to above. It should be understood that only telephone switching systems employing pulse code modulation can use the circuitry of the present invention, and such circuitry interfaces with time devision portions of such switching networks.

2. Description of the Prior Art

An approach to the handling of pulse code modulated information and conference circuitry is taught by U.S. Pat. Nos. 3,699,264 and 4,007,338, which are assigned to the same assignee as the present invention. In these noted patents, digital signals are not converted to analog; rather binary words are compared from the participating channels, with the smallest binary numbers selected as the speaker. An improvement in the conference circuitry disclosed in these above-identified U.S. patents are disclosed in the above-referenced U.S. Pat. No. 4,054,755.

PCM conferencing as taught in the above-identified patents and application requires a source of pulse code modulated (PCM) coded voice samples which have associated time slots. These time slots allow the conference to sequentially receive a code for each conferee. The conference circuitry must be able to recognize who the conferees are and who is not associated with the conference call.

In the above-referenced U.S. Pat. No. 4,054,755, PCM samples are taken for each conferee from the time switch, and via comparator circuits, a PCM sample is sent to the conferee. Since the selected PCM sample is not determined until all samples are compared, a frame delay is required after which all conferees except the selected conferee will receive the selected PCM sample from the previous frame. The selected conferee, in turn, receives a null code (perfect idle channel). To minimize speech clipping or selecting noise, two circuits, a preliminary and a preferred speaker preference circuit, are employed.

The preliminary preference circuit utilizes the identity of the previous selected speaker and after its PCM sample is compared, its binary weight is modified to the highest value of a corresponding curve segment. This is done by adding a bit between the segment and the step bits, allowing the binary value to be decreased. This technique permits the conference circuit to hold onto the previous speaker if the incoming PCM samples are in the same PCM segment or below in value.

The preferred speaker preference circuit functions when the magnitude of the present PCM sample exceeds the value of the preferred preference circuit threshold. When a speaker is selected for the succeeding frame and has a larger PAM (smaller PCM code) sample then the threshold, a preferred preference circuit creates a lower binary weight (apparently larger PAM) to the comparator, for the selected speaker, for a period of one frame. This reduces speech clipping during that time when two or more conferees are conversing simultaneously.

Neither the preliminary nor the preferred preference circuit alters the incoming or the outgoing PCM sample to the comparison circuit to favor the previous speaker.

SUMMARY OF THE INVENTION

The present invention is intended to provide improvements in the multi-port conference circuit taught in the above-referenced U.S. Pat. No. 4,054,755, to reduce or substantially eliminate the problem of high idle channel noise resulting from always choosing the largest signal above null code (quiet or absence of signal), the distortion of signals to the listeners and distortion of the speaker side tone, and finally difficulties from foreign signals.

In experience with the previous inventions, it has been discovered that a major contribution to the speech quality degradation in digital conferencing is due to signal reflections of the original signal circulating and fighting for control of the conference. This problem of signal reflections could be solved by providing either reflective signals of low amplitude in relation to the primary or with no or very little phase shift. However, assuming present hybrid designs must be maintained and termination impedance with wide variations will exist, the solution is shifted to the conference. To provide transmission of only the primary signal, a continuous threshold is established to pass the primary and exclude the reflection. It is only used in the selection process. For conditions which do not provide the threshold being met, the previous speaker is retained. For three-port applications, this requires a memory for each time slot with logic to store the results of this decision and to be used for the same time slot during the next frame. The memory then in combination with the threshold barrier allows the conference to lock to the speaker regardless of what he is saying until someone else takes over. The idle channel noise is helped as only one source is bent so no amplification exists due to previous selections of the noise peaks of the sampled conferees. The side tone distortion is solved as only one signal will pass. The single speaker is improved as long as the reflections are below the threshold. This, then, is critical to system performance. If the threshold is too low, the problems exist (threshold is null). If it is too high, the speaker cannot enable the selection to the proper level. A long trunk connection may have quite a bit of loss so a compromise in level must be made. A variable threshold strapping is provided in the disclosure to provide for optimum applications.

Mutliple speaker operation still provides flip-flop operation and is very rapid as compared to echo suppressor type flip-flopping or speaker phone operation. Thus, the loss of syllables is not heard, however, one may notice the shift of background noise levels, especially if one has a background signal like a radio.

The problem of foreign signals entering conference connections via trunk connections is improved, and can be seen in low level variations on which the idle circuit signal or voice signal ride. The conference requires a common DC reference (null code) to judge the presence of signals. Trunk circuits which allow low frequency signals at low level (60 Hz or its harmonics, for example) to be present cause distortion in the instant speaker case. This is because the larger speaker is always chosen. With the conference circuit of the present invention, the constant switch is greatly reduced, by an improved locking method. The foreign signal is still present, but it is not chopped up due to switching between idle channels.

The present invention also is applicable to a three-port conference and such an application of the principle (that of digital conferencing using threshold level comparison and last speaker memory) of the present invention is disclosed in a copending U.S. patent application, Ser. No. 857,165, filed simultaneously herewith now U.S. Pat. No. 4,126,766 issued Nov. 21, 1978. The three-port conference is really three two-port connections of a single conference, and the system allows for 96 such two-port connections in memory. The multiple port (10, however, it is not necessary to limit the system to any number) is a single conference of 10 and has only one last speaker. The three-port decision, since it is a choice of two sources for each of the three listeners, needs no detection of himself while the ten-port needs to exclude himself.

Generally, in the multi-port conference system, the conference circuitry includes two threshold comparators, one for the new conferee and one for the temporary speaker and various combination logic gates. Also included are pull-up resistors and four straps to determine the coded threshold level.

In operation, the new conferee's PCM is measured against the threshold, as well as that which reaches a temporary speaker PCM buffer. This must also be sensed to see if it is the previous speaker. A signal LASD-1 indicates that the PCM in the conferee PCM buffer is that of the last speaker or "last speaker detected." A signal NSS-1 indicates that the PCM in the temporary speaker PCM buffer is that of the last speaker or "new speaker the same" as last frame. Here, there is a single choice of one speaker out of many conferees. The memory to remember who won last is actually the storage in a buffer of the conferee counter in which the decision was finalized. During the next frame, the conferee's are tested to determine if each corresponds to this count. If so, the signal LASD-1 occurs. If this conferee is allowed to be the temporary speaker this frame, it passes to the temporary speaker PCM buffer and the signal NSS-1 occurs. Only conferees with PCM codes greater than that of the temporary speaker are allowed to take over. A greater code is actually of less binary value so $A<B$ allows the signal UPDATE to exist. The A corresponds to the conferee PCM buffer while B corresponds to the temporary speaker PCM buffer. The term $(\overline{LASD \cdot NSS}) \cdot A < B$ generates UPDATE.

Now, if the conferee is the previous speaker (LASD occurs), it must be updated unless the temporary speaker is a greater signal and also exceeds the threshold. Signal T TEMP indicates that the temporary speaker exceeds the threshold. The term LASD·$(A<B+\overline{T \ TEMP})$ allows update to occur if LASD exists and either the conferee is larger or the temporary speaker PCM buffer does not achieve the threshold. Once in the temporary speaker PCM buffer, the signal NSS occurs. Now only conferees which meet the threshold (T CONF) and exceed the temporary speaker PCM buffer will be allowed to take over. The term NSS·(A<B·T CONF) indicates this. If neither conditions occur (i.e., the previous speaker is not encountered for this decision) just the PCM code values are used with the last being allowed to take over the temporary buffer. Thus, the total equation for updating from the conferee PCM buffer to the temporary speaker PCM buffer is:

$$UPDATE = (\overline{LASD + NSS}) \cdot A < B + LASD \cdot (A < B + \overline{T \ TEMP}) + NASS(A < B \cdot T \ CONF)$$

To permit synchronous operation with the network PCM time switch, timing circuits are generated within the conference circuit which are derived from the network clock.

The circuitry of the present invention is implemented using integrated circuits of conventional design.

BRIEF DESCRIPTION OF THE DRAWINGS

FIGS. 1A and 1B are a schematic block diagram of a conference circuit in accordance with the invention;

FIG. 3 is a pulse chart showing various ones of the system's pulses; and

FIG. 4 illustrates the manner in which FIGS. 1A, 1B and 2 are placed together to form a complete system.

DESCRIPTION OF THE PREFERRED EMBODIMENT

Figures 1A, 3:
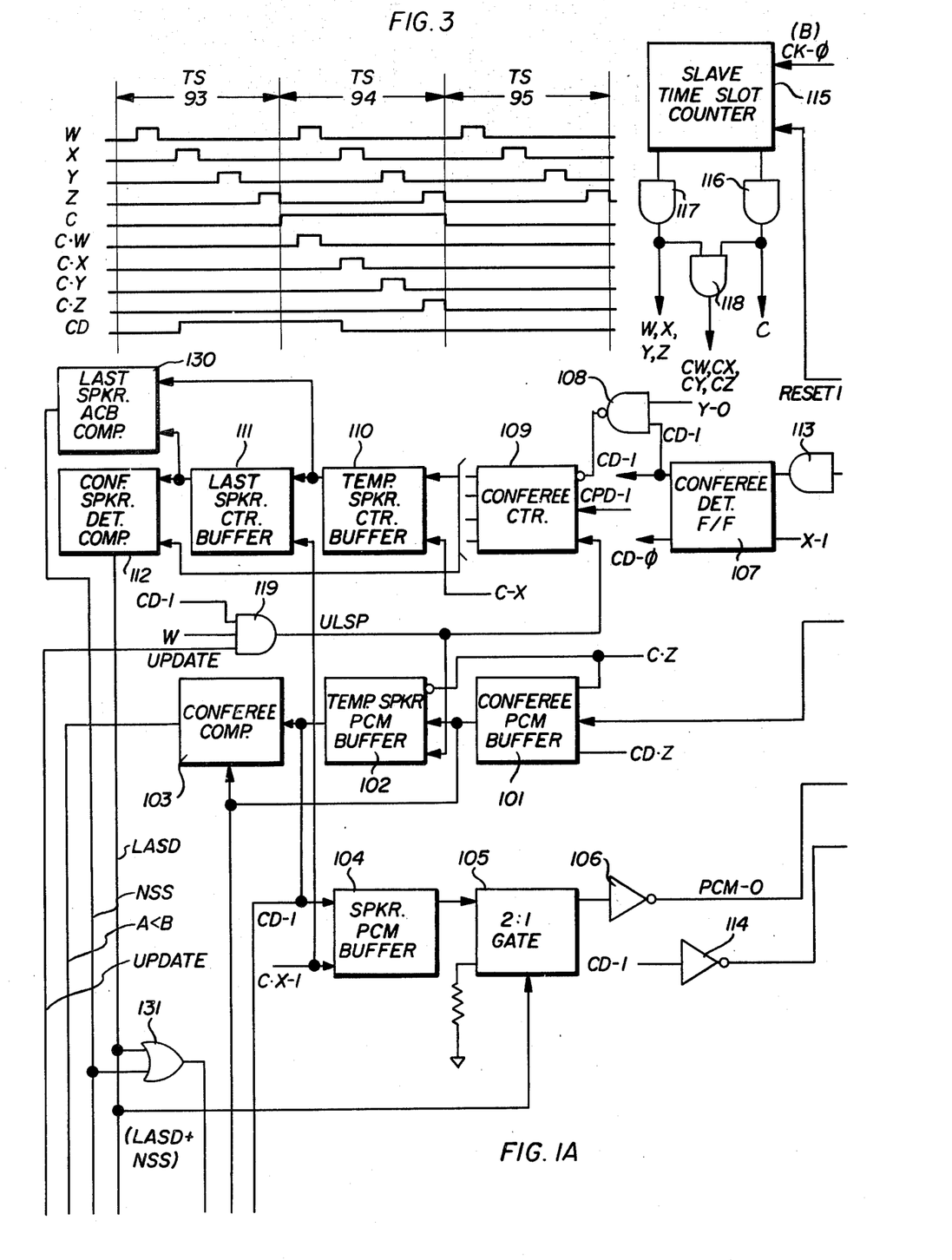
Figures 1B, 4:
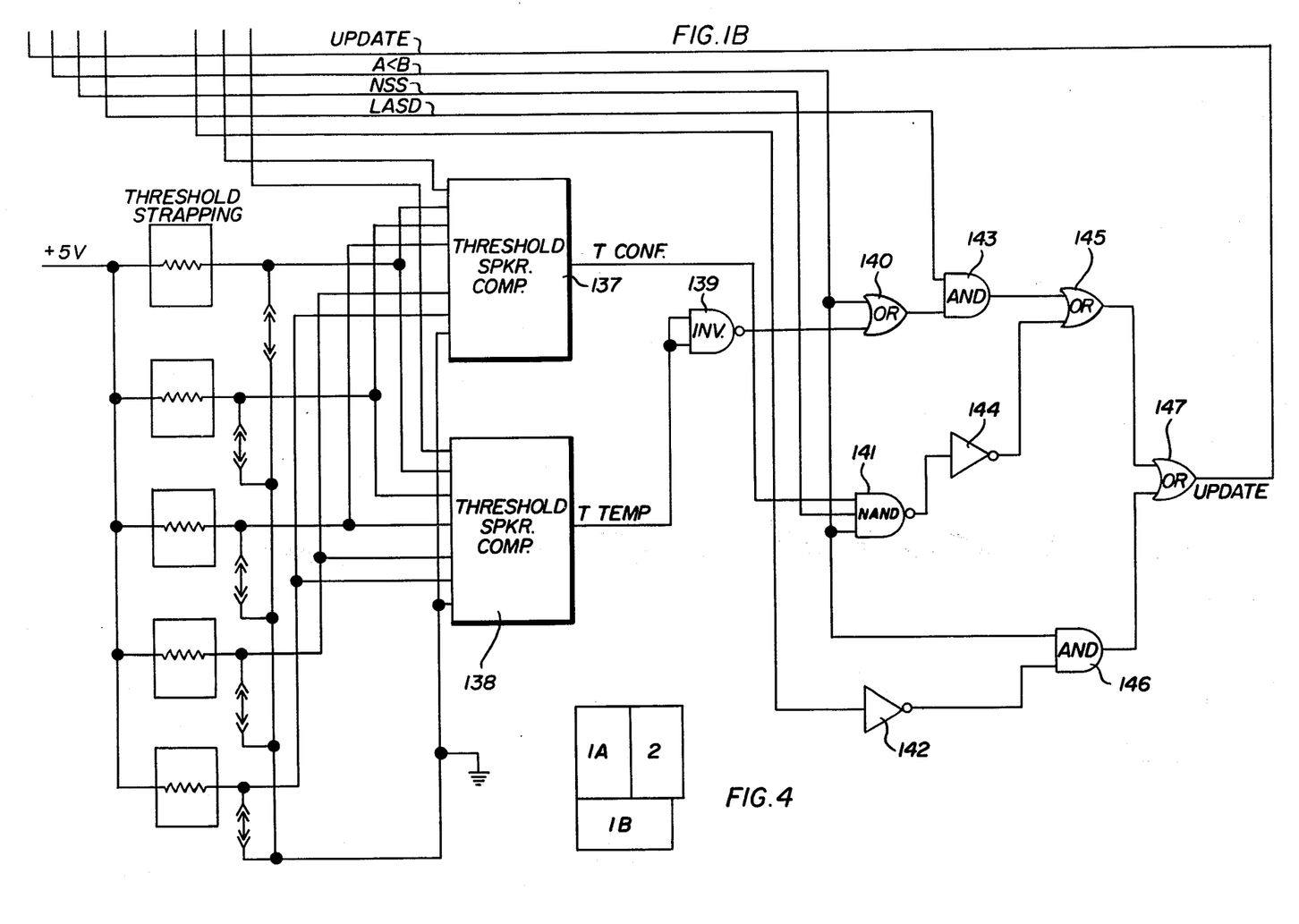

Implementation of the present invention is accomplished by means of circuitry arranged in logic configurations as shown in FIGS. 1A and 1B. It should be noted that detailed circuit configurations of such circuitry have not been shown inasmuch as they do not form a portion of the present invention. It is well within the capability of those skilled in the art to implement the required functional circuitry based on the state-of-the-art technology. Commercially available logic circuit is available to facilitate such implementation.

Referring now to FIGS. 1A and 1B, a conference circuit in accordance with the present invention is shown. The conference circuit includes a slave time slot counter 115 to assure synchronous operation with the network. All timing is derived from the signal CK(B)-$\phi$, from the network clock 260 via inverter 261 (FIG. 2), and is generated by a logic network including symbolic decoding AND gates 116, 117 and 118. The results from the symbolic decoding AND gates which includes logic to perform such decodes may be as anyone skilled in the art might choose. At the end of a frame, the counter 115 is reset by a signal RESET-1 from the network, thus forcing synchronization with the network.

The slave time slot counter 115 generates the output signals A-1, B-1, C-1, which, in turn, create timing signals W, X, Y and Z which occur every time slot in order. When the slave time slot counter 115 reaches the conference port time slot (T.S.94), the signals C and CPD-1 are generated to indicate that the conference port is detected. This signal CPD-1 is used to reset the conferee counter 109, and to further generate the signals C·W, C·X, C·Y and C·Z. These signals occur only during time slot 94 and finalize the selection process. The relationship of these signals is shown in FIG. 3.

The signal C·X-1 is used to transfer the temporary speaker identity stored in the temporary speaker counter buffer 110 to the last speaker counter buffer 111, and to transfer the temporary speaker PCM buffer 102 to the speaker PCM buffer 104. The signal C·Z-1 is used to preset the conferee PCM buffer 101; to preset the temporary speaker PCM buffer 102; and to preset the temporary speaker counter buffer 110.

Figure 2:
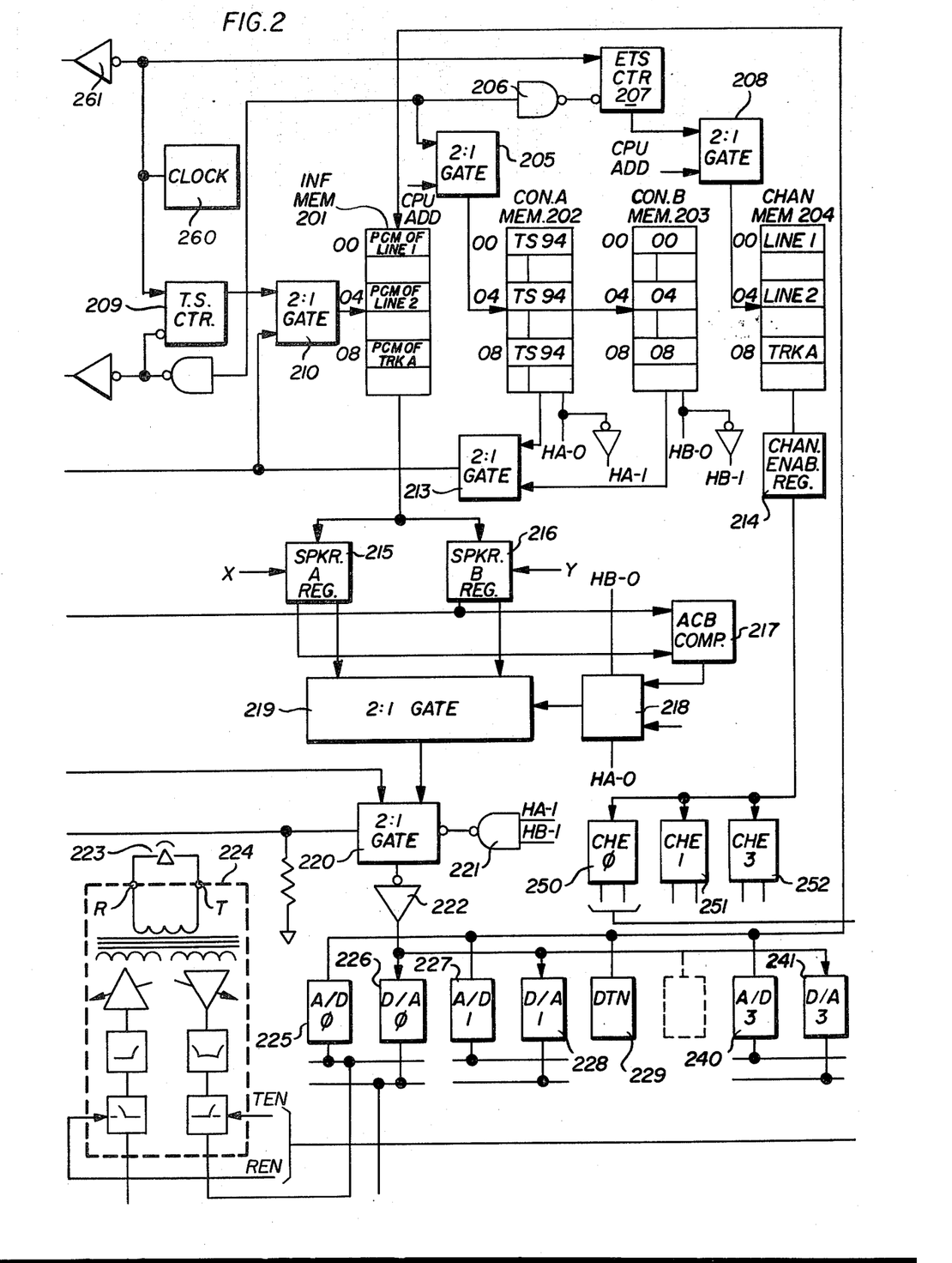
FIG. 2 is a schematic block diagram of a switching network with which the conference circuit is used.

The conference participants are assigned binary identity 94 in control A memory 202 (FIG. 2). This condition along with the absence of the hold bit (CAH-1) is decoded by the gate 113. When ID94 appears, the conferee detected flip-flop 107 is set on X-1, and generates a CD-1 output which controls the conferee functions for the present time slot, including the gating out of the speaker's PCM from the speaker PCM buffer 104, forcing the network steering gate 220 via the inverter 114 to pass the speaker PCM to the listener, allowing the update equation (at gate 119), the loading of the conferee PCM buffer 101 when combined with Z-1(CD·2), setting the 2:1 steering gate 105 to gate the speaker's PCM or null code to the network when combined with Z-0, and advancing the conferee counter 109 when combined with Y-φ (at gate 108). The conferee detect flip-flop 107 is reset to remove the signal CD-1, on same following time slot X-1 pulse when ID94 is not present.

The conferee counter 109 is operated by the signal CD·Y-φ from gate 108 which indicates a conferee has been detected, and is reset by the signal CPD-1 which occurs every frame, during time slot 94. The conferee counter 109 indicates the assigned conference cyclic position of the conferees. The count of the conferee counter 109 will correspond to the PCM stored in the conferee PCM buffer 101. If this PCM is transferred to the temporary speaker PCM buffer 102, the count of the conferee counter 109 also will be stored in the temporary speaker counter buffer 110; thus the identity is retained.

At the end of the comparison period (TS94), the PCM in the temporary speaker PCM buffer 102 is transferred to the speaker PCM buffer 104 and the count stored in the temporary speaker count buffer 110 is loaded into the last speaker count buffer 111. The temporary speaker count buffer 110 is preset by C·Z at the end of the conference time slot (TS94).

The three conferee count identities, i.e., the conferee, the temporary speaker and the speaker, are compared to aid in the decision to update to a conferee to a temporary speaker status. By comparing the conferee counter 109 to the last speaker count buffer 111, the last speaker can be detected. This comparison is made by the comparator 112 which, upon detecting the last speaker, generates the signal LASD-1. Likewise, by comparing the temporary speaker count buffer 110 to the last speaker count buffer 111, it can be detected that the new speaker is the same as the last speaker. This comparison is made by the comparator 130 which, upon detecting this fact, generates the signal NSS-1.

The conferee comparator 103 compares the conferee PCM buffer 101 to the temporary speaker PCM buffer 102. The output signal A<B-1 from the conferee comparator 103 indicates that the conferee PCM code (excluding sign) is less in binary value and thus is greater in PCM value, so it should be retained by transfer to the temporary speaker PCM buffer 102.

The decision to update the temporary speaker is based on a threshold, as well as largest signal (smallest PCM code). The threshold comparators 137 and 138 compare the four highest PCM bits of both the conferee and temporary speaker to a threshold level, thus only codes of smaller binary value achieve the threshold. The signal T CONF indicates that the conferee has achieved the threshold, and the signal T TEMP indicates that the temporary speaker has achieved the threshold.

The signal UPDATE occurs from three conditions. The simplest is when neither the conferee nor the temporary speaker is the last speaker; then, just the magnitude of the codes determines if the conferee should become the temporary speaker. The gate 146 controls this condition. If the conferee is the last speaker (LASD-1), then the temporary speaker must achieve the threshold and represent a larger PCM value. Either of these two conditions being absent allows the UPDATE, via the gate 143. The last condition is when the temporary speaker is the previous speaker (NSS-1). In this case, the conferee must achieve the threshold and represent the greater signal value to allow UPDATE. This latter condition is controlled by the gate 141.

The UPDATE signal is combined at gate 119 with the signals W and CD to generate the update loudest speaker signal (ULSP). This signal loads the conferee PCM buffer 101 into the temporary speaker PCM buffer 102, and also loads the conferee counter 109 into the temporary speaker count buffer 110.

The conferee PCM buffer 101 is loaded by CD·Z and contains true PCM code from the network, since the control A memory 202 contains identity of 94 and the control B memory 203 contains the conferee's own time slot identity. The conferee is sent his own PCM mode, but the conference circuit intercepts it and replaces it with that of the previous frame speaker. The conferee buffer 101 is preset by C·Z.

The temporary speaker PCM buffer 102 contains the PCM code of the largest signal so far this frame. The previous speaker, however, will take over unless the threshold has been achieved. This is loaded by the signal ULSP-1 and preset by C·Z. Thus, the initial speaker will always end up in the temporary speaker PCM buffer 102, unless a code of all ones is seen (perfect idle channel).

The speaker PCM buffer 104 is loaded by C·X-1. This will be the PCM of the conference with the largest signal or the last speaker. The last speaker will be retained if no one achieves the threshold. Thus, buffer 104 will be loaded again the next frame at C·X-1 so it will contain the PCM of the last speaker. All conferees except himself will receive this PCM code.

The steering gate 105 gates out the speaker PCM buffer 104 when CD·Z-φ occurs without LASD-1. When LASD-1 occurs, null code is gated to the network, to the conferee, since he is the one who said this.

Referring to FIG. 2, those portions of a switching network of a PABS employing pulse coded modulated transmission techniques and digital switching on a time division basis which interfaces with the conference circuit of the present invention is shown. Such circuitry includes an information memory 201, a control A memory 202, a control B memory 203 and a channel memory 204. Each memory has a capacity of 768 bits (8×96). Information stored in information memory 201 is derived from PCM out bus-1 which has connections to analog to digital converters such as 225, 227 and 240 and also from digital tone circuitry 229. Control of memory 201 is from clock source 250 which drives time slot counter 209, gate 206, and the 2:1 steering gate 210. The 2:1 steering gate 210 is driven from the 2:1 steering gate 213 whose inputs are connected to control A memory 202 and control B memory 203 outputs. The output of steering gate 213 while inputing to steering gate 210 also is provided to the conference circuit (FIG. 1). Information stored in memory 201 is distributed during X and Y pulses respectively to speaker A register 215 and speaker B register 216, both of which include outputs connected to the input of 2:1 steering gate 219.

Speaker B register 216 also has an output connected to the speaker B PCM-1 bus extending to the conference circuit and to comparator 217. Speaker A register 215 also includes an output to comparator 217. The output of comparator 217 indicates when the information stored in speaker A register 215 is less than (PAM signal is larger than) the information stored in speaker B register 216; and is transmitted to the speaker selection FF. This flip-flop 218 which is also controlled by HB-0 and HA-0 signals produces a speaker B output signal from its $\overline{Q}$ output which is used to control gate circuit 219 whose output is connected to 2:1 steering gate 220. Also connected to steering gate 220 is a conference PCM-0 bus from the conference circuit. Control of gate 220 is via the force conference-$\phi$ signal from the conference circuit and a "null"-$\phi$ signal from NAND gate 221 whose inputs are connected to the HA-1 and HB-1 signals. Outputs from gates 220 are connected to digital-to-analog circuits 226, 228 and 241. The channel memory 204 is driven by an early time slot counter 207 which is reset early by decode gate 206 which decodes the time slot counter 209. The 2:1 steering gate 208 then drives the channel memory to allow channel identities stored in it which includes conferee identities to be outputed to the channel enable register 214 and then to be distributed to channel enable circuits 250, 251 and 252. Pulse amplitude modulated transmission and receive busses provide connections between conference line circuits such as 224, which are gated by channel enable equipment (250) via leads TEN and REN.

Referring now to FIGS. 1 and 2 in combination, the operation being described assumes the switching network of FIG. 2 has been already set up by an associated central processor to allow for a conference of N conferees. The method by which the call has been established is not important and could result from such types of conference applications as progressive, meet me, or attendant (operator) conference. In systems as previously referenced, such determination is all software controlled and results in a network configuration as shown in FIG. 2. The conferees may be served by lines, trunks or might be a PBX attendant or operator.

In the network configuration shown, the conferees equipment identity is stored in the channel memory 204. This location defines its associated time slot and allows signals stored in register 214 ahead of the channel enabling circuitry to generate, transmit enable (TEN) and receive enable (REN) pulses to a conferee circuit such as 224. The control A memory 202 of the same time slot (i.e., same memory word address of the channel memory 204 word with the identity) has the hold bit "off" and a time slot address of 94. This identifies this time slot as a conference member (conferee). The control B memory then must have the hold bit also "off" and its own time slot address stored in it. For purposes of the present discussion, assume the conferees are lines 1 and 2 and trunk A, and are as illustrated in the memories of FIG. 2. This allows the network speaker B register 216 to contain the pulse code modulation information of each conferee during its own time slot.

At this time the circuitry is ready to provide a conference for three conferees, and will result in one speaker every frame and two listeners. The speaker will not hear anything for that frame he is chosen and null code is sent to him. The heavy lines shown in FIGS. 1 and 2 show the flow of pulse code modulated signals indicative of voice signals over 8 bit parallel paths. All logic functions, registers, etc., included in the above noted path are also 8 bits wide.

Beginning now with the slave time slot counter 115 at a count of 94 which is the conference time slot the following occurs: the contents of the temporary speaker PCM buffer 102 is transferred to the speaker PCM buffer 104 and the temporary speaker counter buffer 110 contents are transferred to the last speaker counter buffer 111 by signal C·X. The conferee PCM buffer 101, and the temporary speaker PCM buffer 102 and the temporary speaker count buffer 110 are preset by the signal C·Z, and the conferee counter 109 is reset by signal CPD-1. In the switching network of FIG. 2, the conference time slot receives a "null" code. The network will now cycle through time slots 95, 96, 0, 1, etc. through 00.

When time slot 00 occurs, the following events transpire. The network will load the PCM information of line 1 into the information memory 201. This will occur when pulse W is present. Control memory A 202 is being read at this time and will be decoded by gate 113 to be 94. At time X, the conferee detected flip-flop 107 will be set and will provide the signal CD-1. The signal CD-1 gates out the speaker PCM in the speaker PCM buffer 104 to the steering gate 105. During time X, the network also will load a "null" code or "quiet" into the speaker A register 215. During time Y, the PCM information for line 1 will be loaded into the speaker B register 216. The conferee counter 109 is then loaded when the signal CD·Y is present, and its count (1) will correspond to the PCM stored in the conferee PCM buffer 101.

The speaker B register 216 information will be loaded into the conferee PCM buffer 101 during time Z by the signal CD·Z. The network will then compare the speaker A and speaker B registers 215 and 216 respectively and choose the information located in the speaker B register 216 (unless B is equal to "null" code) and attempt to output this information through the steering gate 129. However, the signal CD·Z-$\phi$ forces the PCM information in the PCM buffer 104 (this is the PCM information of the preceding frames speaker) through steering gate 105.

The contents of the conferee PCM buffer 101 is then compared by the conferee comparator 103 to the contents of the temporary speaker PCM buffer 102 and will be less, (i.e., A less than B) in binary value based on its greater PAM value. The conferee comparator 103 then provides the signal A<B-1. Also, the contents of the conferee counter 109 is compared by comparator 112 to the contents of the last speaker count buffer 111 for the best speaker. If the last speaker is detected, the signal LASD-1 is provided by the comparator 112. The temporary speaker count buffer 111 also is compared to the last speaker count buffer 111 to determine if the new speaker is the same as the last. If so, the signal NSS-1 is provided by the comparator 130.

The decision to update the temporary speaker also is based on a threshold, and for this reason, the outputs of the conference PCM buffer 101 and the temporary speaker PCM buffer 102 are coupled to the threshold comparators 137 and 138, respectively. The output T CONF indicates that the conferee has achieved the threshold, and the output T TEMP indicates that the temporary speaker has achieved the threshold. If neither is the last speaker, then just the magnitude determines if the conferee should become the temporary speaker. The AND gate 146 controls this condition. The signals NSS and LASD, under this condition, are false, so the signal (LASD+NSS) also will be false (gate 131) and the latter is coupled through the inverter 142 to the AND gate 146. The signal A<B-1 is true and also is coupled to the AND gate 146. With both of its inputs being true, the AND gate 146 couples a high or true output to the OR gate 147 to generate the UPDATE signal. With the signal update being true, during CD-1 and W, the AND gate 119 generates the signal ULSP. The contents of the conferee PCM buffer 101 will then be transferred to the temporary speaker PCM buffer 102 and the count in the conferee counter 109 will be transferred and stored in the temporary speaker count buffer 110. This occurs during the W time pulse of the next time slot since the CD (conference detect signal) goes from X time to X of the next time slot. The conferee detected flip-flop 107 will reset at time pulse X.

If the conferee had been the last speaker (LASD-1), then the temporary speaker would have to achieve the threshold and represent a larger PAM value (least binary) to prevent the update. Under these conditions, the signal T TEMP is true and is coupled through the inverter 139 to the OR gate 140. The signal A B is false, and it is likewise coupled to the OR gate 140. With both of its inputs false, the OR gate 140 is not enabled and the input to the AND gate 143 is false, thus disabling it. The output to OR gate 145 therefore is false. The A B input to the NAND gate 141 is false (NSS is also false), thus its output is forced high or true and is coupled through the inverter 144 to the OR gate 145. Since both inputs to the OR gate 145 are false, its ouput to the OR gate 147 is false. The input A<B to AND gate 146 is false, and the signal (NSS+LASD) to gate 142 is false, hence the output of AND gate 146 is fale to the OR gate 147. The OR gate 147 therefore is not enabled, and update is prevented.

If the temporary speaker had been the previous or last speaker (NSS-1), the conferee must achieve the threshold and represent the greater PAM value to allow update. This condition is controlled by the NAND gate 141. Under these conditions, all three inputs (T CONF, NSS and A<B) to the NAND gate 141 are true or high so that its output is forced low. This low is coupled through the inverter 144 to the OR gate 145, and it outputs a high to the OR gate 147 to enable it to generate update.

The switching network now counts through a time of 04. When time slot 04 occurs the following transpires: The network will load the PCM information of line 2 into the information memory 201 during time W. The control memory A 202 is available to the decode logic and the conferee detected flip-flop 107 will set. The conferee counter 109 again is loaded during time Y by the signal CD·Y and the network will load a "null" code into the speaker A register 215 at time X with PCM information of line 2 into the speaker B register 216 during time Y.

The speaker B register 216 information will then be loaded into the conferee PCM buffer 101 during time Z by the signal CD·Z. The network then compares the speaker A and speaker B registers 215 and 216 respectively and chooses speaker B register 216 (again, unless B equals "null" code) and tries to output it through the steering gate 219. The signal CD·Z forces the speaker PCM buffer 104 PCM information (of the preceding frame) through the steering gate 105 to the network.

The conference PCM buffer 101 information is then compared to the temporary speaker PCM buffer 102 information. Also, the contents of the other buffers again are compared with one another and with the threshold, as described above. If update is generated, the contents of the conferee PCM buffer 101 will be transferred and become the new temporary speaker PCM information. The conferee counter 109 information will also be transferred. If the information is not less in binary value, no transfer occurs. The transfer is the function of the ULSP (update loudest speaker) signal which occurs during time W. The conferee detected flip-flop 107 then resets during time X.

The switching network will then continue to advance through time slot 93. For every conferee encountered an attempt will be made to update the information stored in the temporary speaker PCM buffer 102. Note that during each time slot which a conferee is detected the previous frame's conference PCM is forced through steering gate 220 and a determination is made to see if the conferee is the speaker of the preceding frame and whether the conferee and/or the temporary speaker achieve the threshold.

The switching network now reaches time slot 94. At this time pulses C·W, C·X, C·Y and C·Z will sequentially occur. At pulse C·X the temporary speaker count buffer 110 information becomes the last speaker count information for the following frame. The temporary speaker PCM buffer 102 contents (PCM code of the selected conferee) are transferred to the speaker PCM buffer 104 and the temporary speaker count buffer 110 contents (the conference count number) are transferred to the last speaker count buffer 111. The conference PCM buffer 101 and temporary speaker PCM buffer 102 are preset and the conferee counter 109 is reset by signal CPD-1. In the network the conference time slot 94 receives and sends the "null" code.

The above cycle continues as outlined above, searching for a new speaker for the following frame. If no conferees exist, the conferee counter 109 will not advance from reset, and the conferee detected flip-flop 107 will never set. The conferee PCM buffer 101 and temporary speaker PCM buffer 102 are preset to contain a "null" code.

Using the assumed conferees as referenced above and as illustrated in FIG. 2, a specific application can be described as follows:

Time slot 94 of Previous Frame

Assume line 1 is the previous or last speaker. This allows the signals LASD-1 and NSS-1 to be created when line 1 is involved during the sample frame. Also, line 1's PCM will be sent to both line 2 and trunk A, while line 1 receives null code. The results of the sample frame will likewise control the following frame. All counters and registers are also initialized during this time except those indicating the conference speaker (i.e., last speaker count buffer 111 and speaker PCM buffer 104). The conference speaker PCM buffer 101 and the temporary speaker PCM buffer 102 are preset to null.

Now, assume for the sample frame that line 1 said nothing (idle channel), line 2 achieves the threshold and the trunk A also achieves the threshold but is below that of line 2 (larger in code value). The operation then is as follows.

Time Slot 00

The new conferee is the previous or last speaker, so LADS-1 occurs. The temporary speaker PCM buffer 102 is empty, so T TEMP is false, thus allowing update to occur. The signal ULSP-1 is generated, and the conferee's PCM is transferred from the conferee PCM buffer 101 to the temporary speaker PCM buffer 102. Also, the count of the temporary speaker count buffer 110 will now equal that of the last speaker.

Time Slot 04

The new conferee is line 2, and NSS-1 exists since line 1 is the temporary speaker. However, the PCM of line 2 is larger (less in binary value) and also achieves the threshold so that the condition NSS(A<B·T CONF) is true and allows UPDATE to occur. The contents of the conferee PCM buffer 101 is transferred to the temporary speaker PCM buffer 102 so that the latter now contains the PCM code of line 2 and the temporary speaker no longer equals that of the last speaker.

Time Slot 08

The new conferee is trunk A and neither LASD or NSS exists. Since the PCM of the trunk A is less than that of line 2 (greater in binary value), signal A<B is false. No UPDATE occurs. Both T CONF and T TEMP occurred, but were not used, since the last speaker is not involved. If the last speaker is not seen, only the larger signal is needed to be saved. If the last speaker has been seen, only someone larger who also achieves the threshold could have kept the last speaker out of the temporary speaker PCM buffer 102 (LASD-1), or overtaken the last speaker if the last speaker was in the temporary speaker PCM buffer 102.

Time Slot 94 of This Frame

Now, the temporary speaker (line 2) becomes the new conference speaker. The signals LASD and NSS are generated by him and his PCM is provided to both line 1 and trunk A for the next frame. Line 2, however, hears a null code.

For the next frame, assume line 1 again says nothing, line 2 is below threshold, and trunk A is above the threshold.

Time Slot 00

The new conferee is line 1. If he is larger than null, he would move to the temporary speaker PCM buffer 102. Since line 1 said nothing (perfect idle channel), however, no UPDATE occurs. Any other code value would have generated UPDATE, since neither LASD nor NSS occurred.

Time Slot 04

The new conferee is line 2. The signal LASD occurs, so UPDATE occurs, since T TEMP is not present along with A<B.

Time slot 08

The next conferee is trunk A, and NSS occurs since line 1's PCM is in the temporary speaker PCM buffer 102. Since trunk A achieves the threshold and also is larger than line 2 (less in binary value), the term NSS(A<B·T CONF) generates update.

Time Slot 94

Now, the trunk A becomes the speaker for the next frame.

While but a single embodiment of the present invention has been shown it will be obvious to those skilled in the art that numerous modifications may be made without departing from the spirit of the present invention which should be limited only by the scope of the claims appended hereto.

What is claimed is:

1. In a pulse code modulated communication system, a plurality of communication channels arranged on a multiplexed basis, a switching system including a memory access by said communication channels and a conference circuit including, a first register connected to said memory operated to store the coded value of information from each of said channels conducted sequentially through said memory; a second register connected to said first register and including an output circuit; a first comparator circuit connected to said first and to said second registers operated to compare the coded value of information stored in said first and said second registers and in response to determination that the value of information stored in said first register is less than the value of information stored in said second register to provide an output signal; counting means connected to said memory periodically incremented in response to signals from said memory, a fourth register connected to said counting means operated to store the count of said counting means, a fifth register connected to said fourth register, said count stored in said fourth register transferred to said fifth register in response to signals from said switching system, a second comparator circuit connected to said fourth and fifth registers operated in response to a determination that the count stored in said fourth and fifth registers are equal to provide an output signal; a third comparator circuit connected to said fourth and fifth registers operated in response to determination that the count stored in said fourth and fifth registers are equal to provide an output signal; a sixth register connected to the output of said second register and having an output to said switching system operated in response to a signal from said switching system for transfer of said coded value of information in said second register to said channels under control of said switching system; a first threshold comparator, the contents of said first register being connected to said first threshold comparator and the latter providing an output when said first register achieves an established threshold; a second threshold comparator, the contents of said second register being connected to said second threshold comparator and the latter providing an output when said second register achieves said established threshold; and gating means connected to said first, second and third comparator circuits and to said first and second threshold comparators selectively operated in response thereto to provide an output signal to update, said update signal being coupled to said first and second registers to operate them to transfer the coded value of information stored in said first register into storage in said second register, said update signal further being coupled to said first counting means to operate the latter to transfer the count in said first counting means into storage in said second counting means.

2. In a pulse code modulated communication system as claimed in claim 1, wherein: said gating means comprise a plurality of gate circuits including a first gate circuit connected to said second and third comparator circuit and a second gate circuit connected to said first comparator circuit and to said first gate circuit, said first and second gate circuits being selectively operated to cause said update signal to occur when neither said second and third comparator circuits provide an output signal and said first comparator circuit does provide an output signal.

3. In a pulse code modulated communication system as claimed in claim 1, wherein: said gating means comprise a plurality of gate circuits including a third gate circuit connected to said third comparator circuit, and a fourth gate circuit connected to said first comparator circuit and to said second threshold comparator, said fourth gate circuit being selectively operated to cause said update signal to occur when said first and third comparator circuits and said second threshold comparator all provide output signals.

4. In a pulse code modulated communication system as claimed in claim 1, wherein: said gating means comprise a plurality of gates including a fifth gate circuit connected to said first and third comparators and to said first threshold comparator and selectively operated to cause the signal update to occur when said first and third comparators and said first threshold comparator all provide output signals.

5. In a pulse code modulated communication system as claimed in claim 2, wherein: said gating means comprise a plurality of gate circuits including a third gate circuit connected to said third comparator circuit, and a fourth gate circuit connected to said first comparator circuit and to said second threshold comparator, said fourth gate circuit being selectively operated to cause said update signal to occur when said first and third comparator circuits and said second threshold comparator all provide output signals.

6. In a pulse code modulated communication system as claimed in claim 3, wherein: said gating means comprise a plurality of gates including a fifth gate circuit connected to said first and third comparators and to said first threshold comparator and selectively operated to cause the signal update to occur when said first and third comparators and said first threshold comparator all provide output signals.

7. In a pulse code modulated communication system, as claimed in claim 1, further comprising means connected to said first and second threshold comparators for providing a variable threshold.

* * * * *